United States Patent [19]

Rose

[11] Patent Number: 4,673,819
[45] Date of Patent: Jun. 16, 1987

[54] SENSING PROBE FOR SLUDGE DETECTORS

[75] Inventor: Thomas A. Rose, LaGrange, Ill.

[73] Assignee: Ecolotech, Inc., LaGrange, Ill.

[21] Appl. No.: 761,433

[22] Filed: Aug. 1, 1985

[51] Int. Cl.[4] ............................................. G01N 21/01
[52] U.S. Cl. .................................... 250/573; 250/577; 356/436
[58] Field of Search ............... 250/573, 577, 564, 565; 73/293; 340/619; 356/436, 441, 442

[56] References Cited

U.S. PATENT DOCUMENTS

| | | | |
|---|---|---|---|
| 3,441,737 | 4/1969 | Topol | 250/564 |
| 4,072,424 | 2/1978 | McMullan et al. | 250/573 |
| 4,304,492 | 12/1981 | Fox | 250/573 |

Primary Examiner—Edward P. Westin
Attorney, Agent, or Firm—Mann, McWilliams, Zummer & Sweeney

[57] ABSTRACT

A sensing head for sludge detectors for use in effecting accurate sludge level detection in settling tanks, clarifiers, digesters, and the like, wherein the head that serves as the device probe comprises a cylindrical housing centered in its longitudinally extending axis and defining a reentrant indentation at one side of the head which extends toward the head other side beyond the longitudinal axis and defines a pair of opposed upper and lower housing walls and a gap therebetween, with such walls respectively having a light source and a light sensitive device, both separately lens covered, in electrically connected relation with the detector cable of, for instance, portable detectors, to which cable the head is separately connected, for make-break light principal operation when the head is submerged in use; the head housing has upper and lower end caps sealingly secured thereto, an elastomeric bumper mounted on the lower end cap to protect the head lower end and sides from damage, a lens guard mounted in the housing gap to protect the head sensing mechanism, and a cooperating pressure nut, gland ring, and grommet arrangement at the head upper end for leak free securement of the head to and about the cable end to which the head is connected.

15 Claims, 11 Drawing Figures

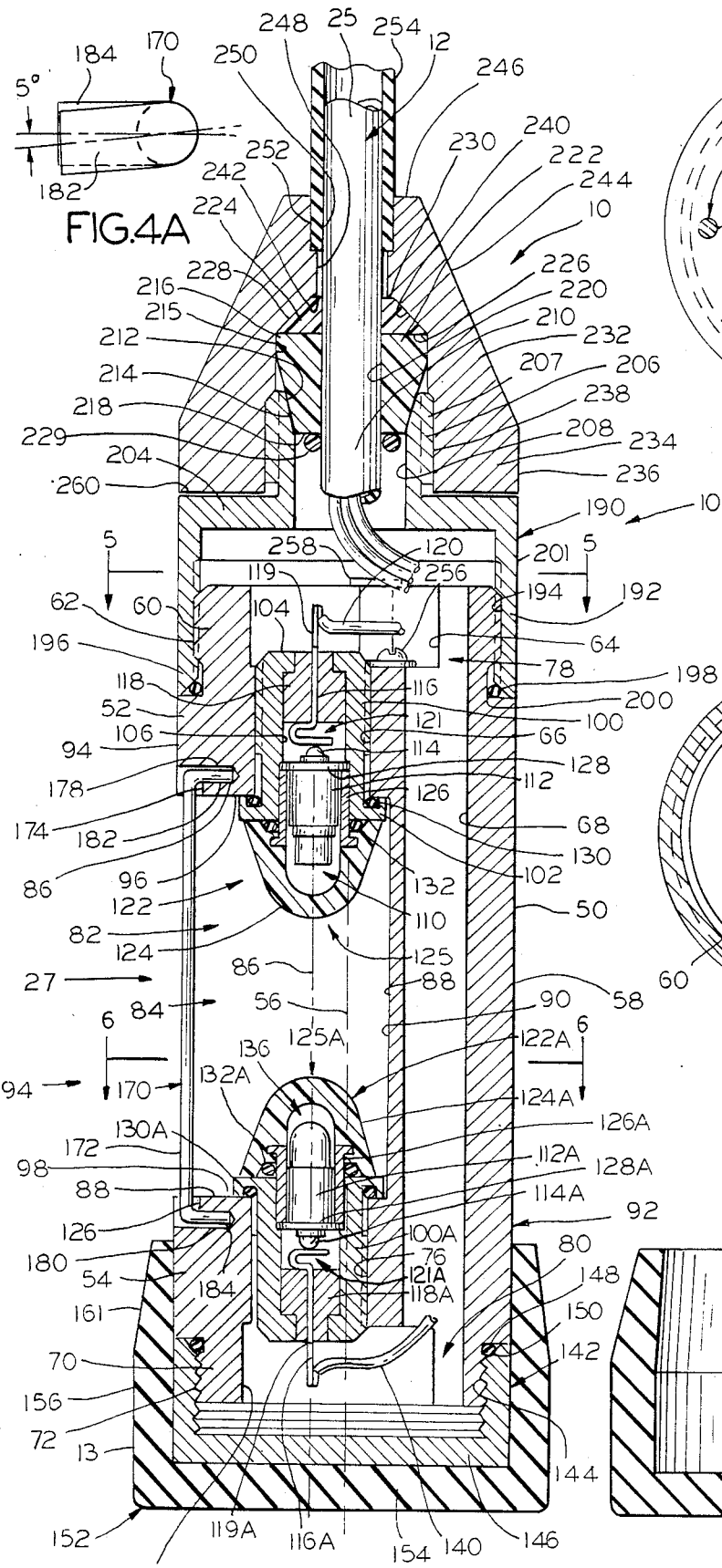
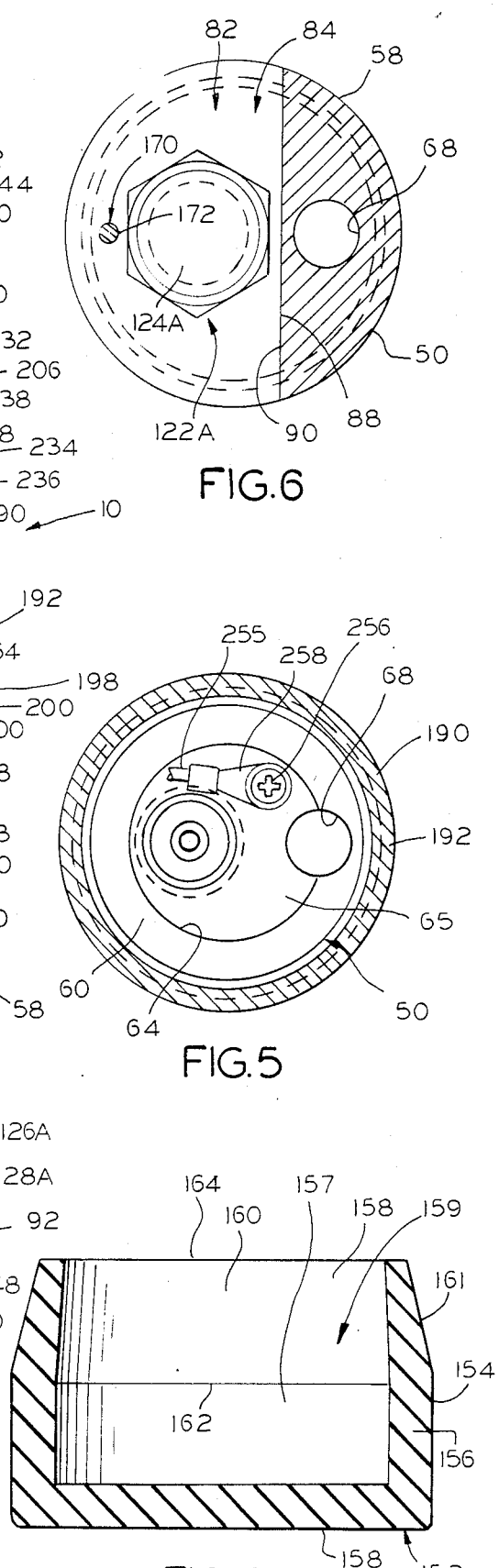
FIG.4A
FIG.4
FIG.6
FIG.5
FIG.7

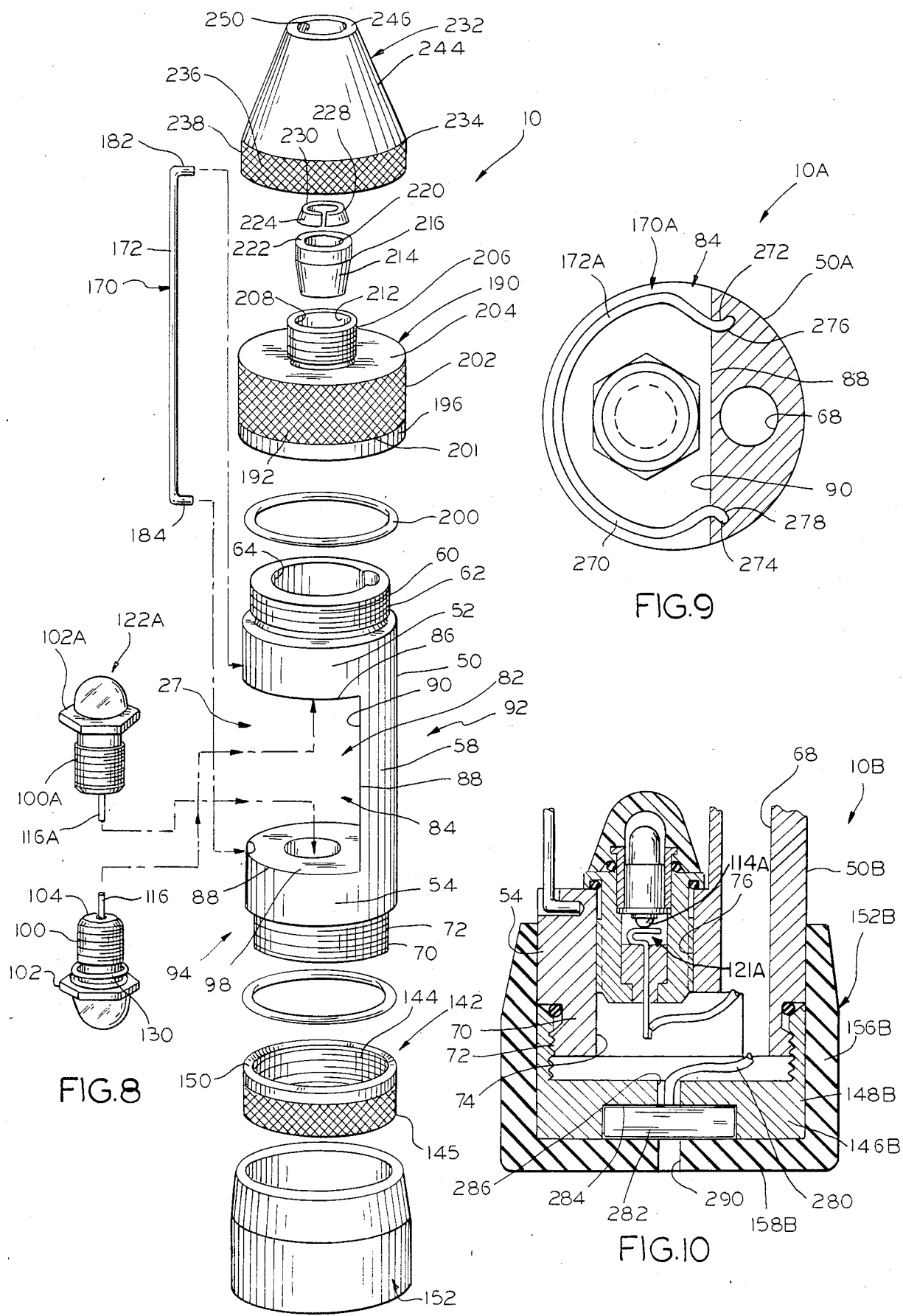

SENSING PROBE FOR SLUDGE DETECTORS

The present invention is directed to sludge level detectors for testing the turbidity of liquid in settling tanks, clarifiers, and the like, and more particularly, the present invention is directed to a sensing head therefor and its connection to the cable end, for instance, of portable sludge detectors, to which the head is applied for use as a sludge detector.

Topol U.S. Pat. No. 3,441,737, granted Apr. 29, 1969, now assigned to the assignee of the present application, is directed to a sludge level indicator device for use in testing the condition of the turbidity of liquid of settling tanks, clarifiers, digesters, lagoons, and the like, to determine the degree of settling, and also locate the level of sludge or settled particles in the body of liquid (usually water) being tested. The disclosure of said Topol patent is incorporated herein by this reference.

One embodiment of the invention of said Topol patent takes the form of a portable sludge level detector that includes a sensing head or probe applied to one end of a sheathed electrical cable that has its other end electrically connected to a readout device that is normally hand held in use and comprises a combination signal receiver and speaker unit that includes solid state circuitry that is connected to the sensing head through the sheathed cable, a speaker for the audio signal that is involved in that particular arrangement of said Topol patent, which operates on the make-break light principle disclosed in said Topol patent, and a battery (the commonly available 9 volt size battery is appropriate) that provides the source of electrical energy involved, under the control of the operator through a conventional push button off-on switch that forms a part of the receiver unit.

This version of the Topol patent arrangement is embodied in the portable sludge level detector offered by Ecolotech Inc. of LaGrange, Ill. as that Company's Model 8000 SCCS unit.

The present invention is concerned with a modified and improved sensing head or probe that is specifically adapted for, but not limited to, portable sludge level detector equipment use.

Principal objects of the present invention are to provide a sensing head or probe arrangement for portable sludge level detectors or the like that is of simplified arrangement for ease of assembly, that as assembled fully seals off the electrical components of the head from leakage both at the connection of the head to the cable and elsewhere throughout the head, that is arranged to have the head light emitting and receiving assemblies field replaceable, protect them from damage, both by the shape of the head and a special lens guard arrangement that forms a part of the head, to provide for resilient bumper protection for such assemblies as well as for both the bottom and lower sides of the head against damage that has heretofore been occasioned by the head impinging against hard submerged objects, and that provides for full fluid tight sealing of the head both at the connection of same with the electrical cable as well as throughout the head itself.

Other important objects of the invention are to provide a sensing head arrangement or probe for portable sludge detectors and the like, that is of streamlined cylindrical configuration for minimized disturbance of the sludge in use, that is arranged to provide a sludge sensing gap within the projection of the head housing into which the liquid being tested readily intrudes without disturbance of the particulate matter in same, that is bumper protected against abrasion and wear at the lower end thereof because of engagement with hard submerged objects in use, that sets the sensing head light source and cooperating photocell device well within the head sensing gap and in spaced apart opposed relation for maximized protection and efficiency in use, that provides for effective bracing of the cable at and adjacent the connection of the head to the cable, and that provides shielding protection for the light source and photocell device assemblies, and especially the lenses thereof, without interferring with or detracting from the free intrusion of the liquid being tested within the head gap.

Yet other objects of the invention are to provide a sensing head or probe arrangement for portable sludge detectors of the type indicated that is inexpensive of manufacture, easy to apply to the cable in assembling the sludge detector equipment involved, that provides a high level of efficiency in use, and that is adapted for ease of cleaning and repair or replacement in the field.

In accordance with the invention, a sensing probe or head is provided for use in accordance with the invention of said Topol patent, which probe or head is especially effective for portable sludge detector equipment use, with the sensing head or probe comprising an elongate cylindrical housing having upper and lower ends and defining a centrally disposed longitudinally extending axis and a cylindrical peripheral side wall that is substantially centered on the housing longitudinal axis, with the housing being formed intermediate its ends to define a reentrant indentation at one side of the head that interupts its side wall and forms a pair of opposed spaced apart housing walls of similar dimensions, that, together with the housing wall that extends therebetween and in substantial parallelism with the housing longitudinal axis, define a gap that lies wholly within the projection of the housing side wall about said axis; applied in sealed relation to one of the housing transverse walls is a source of illumination, and applied in sealing relation to the other housing transverse wall is a light sensitive device, with the source of illumination and the light sensitive device being disposed in opposed in-line or coaxial relation longitudinally of the housing and across the indicated gap. The head source of illumination and light sensitive device are each covered by a lens, with such lenses being seated back well within the housing gap into which the liquid and the sludge contained in same is to intrude in the use of the device; the respective lenses are thus positionally disposed to be protected from damage, and they are further shielded or guarded from damage by a seperate protector therefor that is arranged to avoid interference with or detraction from free intrusion of the liquid to be tested into the head gap.

The head housing upper and lower ends are each formed to define a tubular, externally threaded, stud end portion, with a lower end cap being threaded on the housing lower stud portion in sealing relation to the housing and the lower end cap and lower portion of the housing being received in a dished elastomeric bumper or boot that is frictionally received on the head in substantial overlying relation thereto adjacent the head lower end to protect the head lower end and sides from abrasion and wear when the head engages hard submerged objects in use.

The housing includes an upper end cap threadedly received on the housing upper tubular stud portion in sealed relation to the housing, which upper end cap is formed to define an upstanding tubular end portion that projects away from the housing and is formed to define in its bore through which the cable or head is to extend for connection to the electrically oriented devices mounted in the head an annular internal sealing surfacing adjacent the projecting end of the housing upper end cap.

The head includes an elastomeric grommet, a split gland ring, and a compression nut that are also received on and about the cable lower end, with the grommet being applied to the housing upper end cap sealing surface, the gland ring seated against the grommet, and the compression nut having annular internal surfacing and, being threaded for threaded application to the upper end cap stud end portion, whereby the grommet is placed in full sealing relation with both the cable, the upper end cap sealing surface, and the nut when application of same to the housing. The nut is counterbored at its upper end to receive a strain relief sleeve formed from a suitable elastomeric material, with both the compression nut, the indicated counterbore thereof, and the strain relief sleeve providing an elongated annular bearing arrangement about the cable which avoids bending and breaking of the cable at its entrance into the head. Anchored to the cable jacket inwardly of the grommet is an O-ring that inhibits jerking of the cable loose from its connections to the head.

The electrical arrangement of the head, the cable, and the receiver unit to which the cable is connected is in accordance with one of the arrangements disclosed in said Topol patent, with the audio signal arrangement being preferred and operating on a make-break light principle reacting in accordance with the density change in the light path that is established in the sensing head housing gap by the operation of the device, when the sensing head and the cable attached to same are lowered into the liquid to be tested, and the off-on switch of the receiver unit is actuated to connect the cable to the source of electrical energy. As the head descends in the liquid in question, it responds immediately to changing density and transmits the effect to the speaker of the receiver unit (that is hand held by the operator) and thus provides a sound signal for the operator. When the signal diminishes to no sound at all, the sludge or slurry level involved has been reached. Depth marking strips applied to the cable in accordance with the disclosure of said Topol patent indicates the feet of liquid above the sludge blanket involved. Further operation and use may be in accordance with the disclosure of said Topol patent and standard practices for such devices in this field.

Other objects, uses, and advantages will be obvious or become apparent from a consideration of the following detailed description and the application drawings in which like reference numerals indicate like parts throughout the several views.

In the drawings:

FIG. 4 is a longitudinal sectional view through the improved sensing head substantially along the longitudinal axis of same, showing also the cable end to which the head is connected, and portions of the wiring that extends between the head source of illumination and light sensitive device, and the cable;

FIG. 4A is an end view of the lens guard device employed in the head or probe embodiment shown in FIGS. 1, 3, and 4;

FIG. 5 is a transverse cross-sectional view taken substantially along line 5—5 of FIG. 4, showing the manner in which the housing is grounded as part of the electrical circuiting involved;

FIG. 6 is a transverse cross-sectional view through the improved head at the head gap, taken substantially along line 6—6 of FIG. 4;

FIG. 7 is a longitudinal sectional view through the bumper that is shown applied to the lower end of the probe or head in FIG. 4, but showing the bumper shaping that is involved prior to application of the bumper to the sensing head;

FIG. 8 is an exploded perspective view of the improved sensing head or probe;

FIG. 9 is a view similar to that of FIG. 6, but illustrating a modified lens protector arrangement for the head; and FIG. 10 is a fragmental sectional view, taken along the longitudinal axis of the head at its lower end, illustrating an alternate embodiment arranged to provide a visual readout, at the receiver unit device (see FIG. 2) of the liquid pressure encountered by the probe at night.

Figure 2:
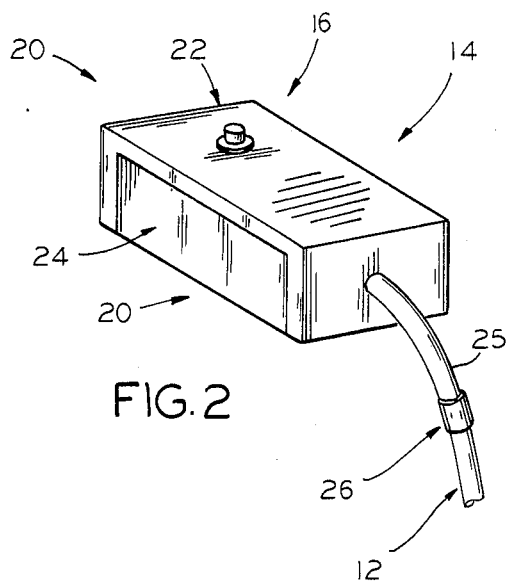
FIG. 2 is a perspective view of the receiver unit or device to which the improved sensing probe or head is connected by the cable in question, a portion of which is shown in FIG. 2, with FIG. 2 being substantially the same as FIG. 2 of the referred to Topol patent.

However, it is to be distinctly understood that the specific arrangements shown in the application drawings are provided to comply with the requirements of the Patent Laws, and that the invention is susceptible of modifications and variations that will be obvious to those skilled in the art and that are intended to be covered by the appended claims.

GENERAL DESCRIPTION

Reference numeral 10 of FIGS. 1, 3, 4 and 8 generally indicates a sensing probe or head of the general type disclosed in said Topol patent, that when operably connected to cable 12 and readout mechanism 14 (that is in the form of an audio signal receiver and sound emanating device 16 that is disclosed in said Topol patent), form portable sludge level detector 20. The probe or sensing head 10 has upper end 11 and lower end 13.

As disclosed in said Topol patent, the cable 12 includes leads or conductors that are incorporated in the electrical system wiring diagram that forms the subject of FIG. 5 of said Topol patent, which electrical system is controlled by a suitable hand operated off-on switch 22 that is part of the receiver housing 24 into which cable 12 extends.

The receiver device 16 in addition to the off-on switch 22 includes a battery serving as the source of electrical power for the detector 20 (a single commercially available 9 volt battery will suffice) and a speaker, with the electrical circuitry involved, when the switch 22 is finger pressed to the "on" position, energizing the electrical system in accordance with the make-break light principle involved that reacts to density changes in the light path at sensing head 10. The cable 12, which in a commercial embodiment is thirty feet in length and is covered by a neoprene sheathing 25, is marked along its length measuring from the probe or head sludge sensing site 27 with suitable indicia 26 that is to indicate the depth that the probe or head 10 is lowered to within the liquid at the time the signal of the detector 20 is emanated by the readout unit 14. In a commercial form of the detector 20, the indicia 26 are formed by short lengths of adhesive tape wrapped around the cable sheathing 25 at the appropriate measurement (for instance, in feet) from the top 30 of the probe or head 10. As the sensing probe or head 10 is being lowered into the body of liquid (usually water) being tested, the probe or head is arranged, when electrically energized, to respond immediately to changing densities of solids in the liquid, and transmits the effect involved to the readout unit 14 which generated a sound or audio signal. When the sound signal diminishes to no sound at all, the sludge or slurry level of the body of liquid involved has been reached by the probe or head 10, with the depth footage thereof being indicated by the foot number of the indicia 26 that is adjacent the surface of the body of liquid in question at the time the sound signal in question disappears.

The improvements of this application are concerned with the arrangement of the probe or head per se. The electrical system involved as well as the operation of same as a portable sludge level detector are in accordance with the disclosure of said Topol patent.

THE IMPROVED SENSING HEAD ARRANGEMENT

Referring now to FIGS. 4–8, in accordance with the present invention, the probe or sensing head 10 comprises housing 50 that preferably is formed from a suitable corrosion resistant electrically, conductive material, such as brass, with the exterior of housing 50 (see FIG. 1) being suitably chrome plated. In the form shown, the housing 50 is of generally elongate cylindrical configuration having upper end 52 and lower end 54, with the housing being struck about a centrally disposed longitudinally extending axis 56 to define a cylindrical peripheral side wall 58 that is centered on said axis 56 (and is what is chrome plated).

The housing 50 at its upper end 52 is formed to define tubular stub portion 60 that is externally threaded as at 62, the bore 64 of which is open to internally threaded bore 66 (see FIG. 4) that extends through housing end 52, as well as a bore 68 that extends the length of the housing 50 and through its end portions 52 and 54.

The housing 50 at its lower end portion 54 defines tubular stub portion 70 that is externally threaded as at 72, the bore 74 of which is open to an internally threaded bore 76 (see FIG. 4) that extends through housing end 54, as well as the longitudinally extending bore 68. As indicated in FIG. 4, the longitudinally extending housing bore 68 opens into the respective housing member bores 64 and 74 where indicated at 78 and 80, respectively.

In the specific embodiment illustrated in FIGS. 4–8, the housing member 50 intermediate its end portions 52 and 54 is formed at sensing site 27 to define a reentrant indentation 82 defining gap 84, with the indentation 82 forming a pair of opposing spaced apart housing walls 86 and 88 that extend substantially transversely of the housing 50, with the housing internally threaded bores 66 and 76 being aligned longitudinally of the housing 50 and coaxial about an axis 86 (see FIG. 4) that is disposed within the projection of the housing side wall 58 about said longitudinal axis 56. The reentrant indentation 82 within housing 50 forms planar wall 88 defining planar wall surfacing 90 that is spaced toward the side 92 of the head 10 from the housing longitudinal axis 56, as distinguished from the head side 94 (see FIG. 1). The planar surfacing 90 extends normally of the respective planar surfacings 96 and 98 of the respective transversely extending walls 86 and 88.

Received in the internally threaded upper bore 66 of the housing 50 is an externally threaded insert member 100 having an outwardly flanged end 102 and an inwardly flanged end 104 as well as a bore 106 (see FIG. 4) that extends longitudinally of same. The internally threaded bores 66 and 76 are equal in length and diameter, with the bore 76 receiving a similar insert member 100A that is similar in all respects to the insert 100.

The insert member 100, and its bore 106, threadedly mount a suitable photo resistor or photocell 110, such as the number CL1980 unit offered by Clairex Electronics Division of Clairex Corp., Mt. Vernon, N.Y. Photocell 110 is operably associated with and within cylindrical base 112 in a suitable state of the art manner to define electical contact means 114 that engages suitable lead strip 116 mounted in insulator 118 (preferably formed from nylon or the like), which strip 116 is appropriately connected to one of the head lead wires 120 to form an electrical circuitry system of the type disclosed in said Topol patent. In the form shown, strip 116 (which is preferably formed from spring brass) is closely received in insulator 118 from the narrow end of the latter, and is serrated at its edges as at 119 to prevent withdrawal; the other end of strip 116 is bent into hook configuration 121 against which the contact 114 is pressed. Cylindrical base 112 is flanged as at 128.

The bore 106 of the insert member 100 also threadedly mounts lens assembly 122 that is applied over the photo resistor unit 110 and its base 112 in the manner indicated in FIG. 4, with the lens assembly 122 comprising clear plastic lens 124 that is fixed to mounting sleeve 126 which is suitably threadedly received in the insert member bore 106, the latter seating against the flange 128 of the base 112 to bias contact 114 against the hooked end of the contact strip 116. As indicated in FIG. 4, suitable O ring seals are applied where indicated at 130 and 132 to render the housing 50 liquid tight at the bore 66.

The photocell 110 as applied to base 112 and lens assembly 112 form a field replacable photocell assembly 125 that is removably applied to insert member 100 of head 10.

The bore 76 is similarly equipped with the indicated insert member 100A is identical to insert member 100 and mounts electrical lamp 136 (see FIG. 4), in the same manner that insert 100 mounts assembly 125, and in direct opposition to and axially aligned with the photocell assembly 125, and specifically its photocell 110, with the other components associated with the housing bore 76 being identical to those associated with the housing bore 66, as indicated by corresponding reference numerals having the suffix "A". The contact strip 116A is suitably electrically connected to lead 140 in a suitable manner conforming to the electrical circuitry disclosed in said Topol patent, the lead 140 extending through the housing bore 68 and into the bore 74 of the housing lower end stub portion 70. Lamp 136 may be of any suitable type, such as the No. 330 lamp offered by Dialight Corp., of Brooklyn, N.Y., and is mounted in and electrically associated with base 112A in any suitable state of the art manner.

The lamp 136 as applied to base 112A and lens assembly 112A form a field replacable lamp assembly 125A that is removably applied to insert member 100A of head 10. The orientation of bores 66 and 76 in which assemblies 125 and 125A are respectively mounted sets them well within gap 84 for maximized protection thereof against breakage by the configuration of the head housing 50 itself.

As indicated in FIG. 4, the probe housing 50 at its lower end 54 has threadedly received on same a lower end cap 142 having internally threaded side wall portion 144 and imperforate end wall 146 for closing off the lower stub portion bore 74. Suitable O-ring seal 148 is applied between the housing and the annular frustoconical sealing surface 150 of the lower end cap side wall 144, to insure that the lower end of the probe is fully sealed against liquid leakage when in use, into housing 50.

In accordance with the present invention, the lower end 13 of the probe or head 10 is equipped with an elastomeric bumper or boot 152, which comprises a dished resilient flexible body 154 (see FIG. 7) defining annular side wall 156 and imperforate end wall 158 integral therewith. It is a feature of the present invention that the bumper or boot be frictionally received on the probe or head lower end 13, and specifically, in overlying relation to the lower end cap 142 and the lower portion 54 of housing 50. The bumper or boot 152 protects the lower end of the housing 50 and the end cap 142 from wear in the form of surface indentment or laceration due to engagement with the submerged hard objects in the liquid being tested, such as concrete or other masonry, metallic piping or fixtures, and the like. Also, the bumper or boot protects assemblies 125 and 125A from jarring engagement with such submerged hard objects (in use).

As indicated in FIG. 4, the external diameter dimension of the perimeter 58 of the housing 50 and its lower end cap 42 are substantially equal. A special feature of the present invention is that the internal diameter of the lower portion 157 of the bumper or boot side wall 156 is substantially equivalent to the indicated outer diameter of the perimeters of the housing 50 and lower end cap 142, while the upper portion 158 of side wall 156 defines annular inner frusto-conical surfacing 160 that converges outwardly of the bumper socket 159 from the inner margin 162 of the surfacing 160 to the rim 164 of the bumper or boot 152, a suitable film thickness dimension, such as 0.01 of an inch.

The bumper or boot 152 is formed from a suitable elastomeric material, such a neoprene rubber and, as indicated in FIG. 8, the external surfacing 145 of the lower end cap 142 is knurlled. The bumper side wall 156 is tapered externally to define outer frusto-conical surface 161.

The relationship of parts involved is that on application of the housing 50 and its end cap 142 to the bumper or boot 152, the bumper or boot 152 is to be pressed into place in bumper socket 159 to the position indicated in FIG. 4, whereby the upper portion of the bumper side wall 156 is stretched somewhat whereby the housing perimeter 58 at the lower portion 54 of housing 50 and the upper portion of knurlled surfacing 145 of the end cap are disposed in close fitting relation with the bumper inner surfacing 158. The result is that any tendency for the bumper or boot 152 to be withdrawn from the lower end 54 of the housing 50 and its end cap 142 is opposed by a suction action created within the bumper or boot end wall 154, as well as the static friction involved in the seating of the bumper or boot side wall 154 against the housing 50 and its lower end cap 142 in use.

Figure 1:
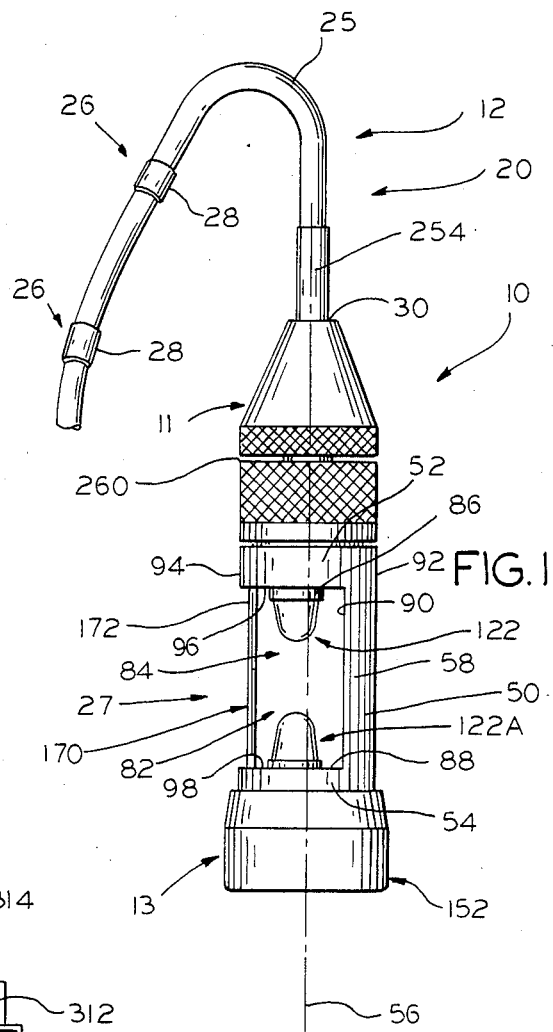
FIG. 1 is a side elevational view of the improved head or probe and a section of the electrical cable attached thereto indicating the way the cable is marked to determine the depth of the sludge blanket located by the practice of the invention.

Further in accordance with the invention, the probe or head 10 is characterized by providing a head gap spanning guard for augmenting the shielding protection for the photocell and lamp 125, 125A, and their respective lens assemblies 122. In the form of the guard that is shown in FIGS. 1 and 4–8, lens guard 170 is provided, which extends substantially parallel to the axes 56 and 86 of the probe or head 10 and spans the gap 84. Furthermore, the lens guard 170 is disposed within the projection of the perimeter 58 of the housing 50 and does not project exteriorly thereof, as is made clear by the showing of FIGS. 4 and 6. FIGS. 1, 4 and 6 further bring out that while the lens guard 170 is disposed in shielding relation to both the assemblies 125 and 125A, (and specifically, their lens assemblies 122 and 122A) it is formed to freely accommodate any liquid intrusion within the gap 84 when the probe or sensing head is submerged in use. For this purpose, the lens guard 170 is of filament configuration and is formed from a suitable rigid or semi-rigid resiliently flexible material to effectively cam or deflect the probe or head 10 away from, or resist entry of submerged objects that might otherwise enter, or find entry into, the gap 84 and damage one or the other of the lenses 122 and 122A, or possibly both.

In the form illustrated, the lens guard 170 is a length of stainless steel music wire having a diameter of approximately 0.22 inch, shaped to define upstanding rod or bar 172 forming a brace member that is of minor cross dimension as compared to the size of the gap 84 (see FIG. 6). Further, the lens guard 170 is mounted in its operative position with respect to housing 50 so as to avoid the formation of apertures in the housing 50 that might cause leakage internally of the housing 50. This is done in the illustrated embodiment by recessing the head housing walls 86, and 88, as at 174 and 176, respectively, in alignment longitudinally of the housing 50, and forming apertures 178 and 180 that respectively extend radially of the housing 50 and are also coplanar aligned longitudinally of the housing 50. The end portions 182 and 184 of the bar rod 172 are angled over approximately 90 degrees, and in addition, these end portions 182 and 184 are displaced somewhat from coplanar relation, as indicated in FIG. 4A, approximately 5 degrees in the illustrated embodiment. On the other hand, the recesses 174 and 176 and their associated radially disposed apertures 178 and 180 are formed in coplanar relation longitudinally of the housing 50, so that the end portions 182 and 184 of the member 172 require pressing into the respective apertures 178 and 180, which action tends to dispose the lens guard member end portions 182 and 184 in substantial coplanar relation, but results in their being biased against the corresponding sides of the housing apertures 178 and 180 in a manner that opposes withdrawal or dislodgement of the lens guard 170 from the probe 10, once the lens guard 170 is mounted in its operative position indicated in FIGS. 1, 4 and 6. The end view of FIG. 4A shows the lens guard prior to its application to housing 50.

Housing 50 at its upper end 52 threadedly receives upper end cap 190 which includes a lower rim portion 192 that is internally threaded as at 194 for threaded engagement with the external threading 62 of the housing upper stub portion 62. The upper end cap 190 at the lower margin 196 of its rim portion 192 is formed to define annular internal frustoconical sealing surfacing 198 that is turned into sealing engagement with suitable O ring seal 200 that is seated against the housing 50 to make the probe liquid seal tight at the connection of the upper end cap 190 to housing 50.

As indicated in FIG. 4, the outer diameter of the upper end cap outer surfacing 201 is substantially identical as that of the perimeter 58 of housing 50. The outer surfacing 201 of the end cap 190 is preferably knurlled as at 202 to assist the asembler in turning same into seal tight relation with the seal 200.

The upper end cap 190 at its upper end includes disc portion 204 that is integral with tubular stub portion 206 which defines external threading 207 and bore 208 that is proportioned to freely receive the cable end 210 (that is connected to head 10) and pass the wiring connections thereof into the hollow interior of the probe or head 10 that is defined by the upper end cap 190 and the bore 64 of housing 50. The upper end cap stub portion 206 is formed with internal, annular, frustoconical bearing surfacing 212 against which is seated the frustoconical surfacing 214 of grommet 216 that is formed from a suitable elastomeric material, such as neoprene rubber, and further defines annular lower end 218, bore 220 that is proportioned for close fitting application to cable 12, and annular upper end 222, with the grommet ends 218 and 222 being formed to be disposed substantially transversely of the probe 10. Seated on the end 222 of grommet 216 is a split gland ring 224, preferably formed from nylon or the like, and defining annular planar end 226 that seats against the end 222 of the grommet 216, frustoconical bearing surfacing 228, and upper end annular bearing surfacing 230, with the surfacings 226 and 230 extending substantially transversely of the probe 10. Suitable O-ring 229 is applied about the cable jacket 25 in tight fitting relation thereto, adjacent but below the grommet lower end 218, and is suitably bonded thereto by employing a suitable cement (such as Goodyear's general purpose adhesive sold under the trademark PLIOBOND).

An important feature of the invention is that cooperating with the gland ring 224 and the grommet 216 is compression nut member 232 that defines a base portion 234 having an annular cylindrical side wall 236 that is knurlled as at 238 (see FIG. 8) and is basically of the same outer diameter dimension as the perimeter 58 of housing 50. The nut member 232 is internally threaded as at 238 for cooperation with the external threading 207 of the upper end cap stub portion 206. Nut member 232 is also internally formed to define annular frustoconical sealing surface 240 (see FIG. 4) that is to cooperate with the corresponding frustoconical surface 228 of the gland ring 224, and transverse annular sealing surface 242 (see FIG. 4) that is to cooperate with the end 230 of the gland ring 224.

It will also be noted that the nut member 232 defines an external frustoconical surfacing 244 that extends a substantial amount of the longitudinal dimension of the nut member 34 longitudinally of the probe 10 and extends from the nut side wall 236 to transversely extending end surfacing 246. Internally of its end surfacing 246 the nut member 234 defines bore 248 (see FIG. 4) that is proportioned to readily receive the end 210 of the cable 12; nut member bore 248 is counterbored as at 252 to receive in close fitting relation thereto strain relief sleeve 254 that is also in close fitting relation to the cable 12 at its bore 250, as indicated in FIG. 4.

Prior to the application of the probe upper end cap 190, the nut member 234, the grommet 216, the gland ring 224, and the relief sleeve 254 to the probe 10, the wiring diagrammatically illustrated at the housing 50 is completed, in accordance with the electrical system disclosed in said Topol patent.

Such wiring includes the application of the ground lead 255 to housing 50, as by application of suitable attachment screw 256 to the floor 65 of housing recess 64 to secure in place fitting 258 to which the ground wire 255 is suitably secured (see FIG. 5).

Prior to the connection of the wiring provided by cable 12 to the component parts of the housing requiring same, the cable end 210 has applied to same, by slipping over the cable, the sleeve 254, the nut member 232, the gland ring 224 (which may alternately be applied to the cable 12 from the side of same), the grommet 216, the housing upper end cap 190, and O-ring 229 in the order indicated. After the wiring connections indicated on the component parts of the housing 50 have been made, O-ring 229 is bonded to the cable sheath 25 in approximately the position indicated in FIG. 4, which is above but close to the severed end of the sheath 25 that exposed the cable wiring for the head connections indicated. O-ring seal 200 is positioned on housing 50, and the upper end cap 190 is threaded onto the housing stub portion 60 and tightened against O-ring seal 200, after which the grommet 216 is brought against the stub portion 206 of the upper end cap, with its sealing surfacing 214 seated against the sealing surfacing 212 of the upper end cap 190. The gland ring 224 is seated against the end 222 of grommet 216, after which the nut member 234 is threaded onto the upper end cap stud portion 206 to compress the grommet 216 against the annular bore surfacing 215 thereof, as well as against the sheathing 25 of cable 12. The parts involved are proportioned so that in the compressed relation of the grommet 216, its lower end 218 is spaced somewhat from O-ring 229.

It is to be noted, in this connection that the frustoconical sealing surfacing 240 of the nut member 234 bears against the frustoconical sealing surface gland ring 224, while the transversely extending annular thrust surfacing 242 of the nut member 234 acts directly against the annular transverse end surfacing 230 of the gland ring, to compress the grommet 216 longitudinally of housing 50 and in liquid sealing relation with the nut member bore surfacing 215, the frustoconical sealing surfacing 212 of the upper end cap stub portion 206, and the external surfacing of the cable sheathing 25, with a slight gap between the nut member 234 and the housing 50 preferably resulting where indicated at 260 in FIG. 4 to insure adequate liquid sealing at the nut member 234 and the upper end cap stud portion 206, about the circumference of the cable sheathing 25. As indicated, the grommet lower end 218 should also be spaced somewhat from O-ring 229 in this relation of the parts involved.

The grommet 216 and gland ring 224 may conveniently be the grommet and gland ring products offered by Kellems Division, Harvey Hubble Inc., of Stonington, Conn. as that Company's parts Nos. 315-18-104 and 316-48-038, respectively.

Thereafter, the strain relief sleeve 254 has its lower end slipped into the upper cap counterbore 252 (as shown in FIG. 4), with these parts being proportioned to provide a substantial bearing area along the sleeve 254 between the sleeve 254 and the cable 12 that avoids bending and breaking of the cable 12 where it emerges from the probe 10.

In the modification illustrated in FIG. 9, the probe 10A is the same as shown in FIGS. 1 and 4 except that the housing 50A is equipped with a modified lens guard 170A, which comprises a rod or wire 172A, having a diameter comparable to that of rod 172 and formed from stainless steel, that is formed to be applied about the mid portion of gap 84, rather than longitudinally of same (as in the case of the embodiment of FIG. 4). Thus, the rod member 172A is shaped to define arcuate mid portion 270 terminating in the respective end portions 272 and 274 that are out of coplanar relation substantially as indicated in FIG. 4A, and are resiliently lodged or seated in the respective mounting apertures 276 and 278 that are formed in the housing wall 88, and specifically its wall surfacing 90, so as to securely mount the lens guard 170A within the gap 84 approximately half way between the respective lens assemblies 122 and 122A.

The lens guard 170A is applied to the housing 50A by the assembler bending the rod 270 as needed to bring the end portions 272 and 274 toward each other as needed to apply them to the respective apertures 276 and 278, after which the rod member 270 is pressed into place so as to be disposed entirely within the gap 284, as indicated in FIG. 9. The probe having housing 50A is otherwise the same as probe 10.

In the modified arrangement of FIG. 10, the probe 10B and the readout 14 to be associated therewith are electrically arranged to provide an electronic readout at the readout device 14 for giving a visual readout of the pressure encountered by the probe 10B when submerged at night.

For this purpose, the cable 12 is modified to include an additional lead 280 that extends from the cable 12 through bore 68 of housing 50B for connection to a conventional pressure transducer 282 that is conveniently lodged in a recess 284 formed in the underside of the housing lower end cap 142B that has been thickened for this purpose, as well as formed with a suitable aperture 286 to accommodate the extension of lead 280 to transducer 282. The side wall 156B of the bumper or boot 152B of the probe 10B is extended sufficiently longitudinally of the probe 10B to be applied over the thickened end wall 146 of end cap 142 and have a fit relative to the housing 50B similar to the fit of the bumper or boot 152 to the housing 50. In addition, the bumper end wall 158B is apertured as at 290 so that the pressure of the liquid in which the probe 10B is immersed has access to the pressure transducer 282. Lead 280 and the wiring connections involved are suitably connected at the readout box 14 to a commercially available electronic readout mechanism with which the readout 14 is equipped that will provide a visual readout of the pressure encountered by the probe 10B when employed at night, for instance, as a portable sludge level detector.

In the probe or head 10B, the housing 50B is otherwise the same as housing 50, as are the other component parts described in connection with the showing of FIGS. 1 and 4–7. Transducer preferably is the compensated model 5701A piezoresistive pressure sensor offered by Ametek Inc. Controls Division, Feasterville, Pa.

It is also to be noted that, as is the case of the sludge detecting devices of the said Topol patent, the probes or heads 10, 10A and 10B have particularly appropriate application for use in sewage treatment plants in which the sewage is pumped into a settling tank 300 (see FIG. 3) and the solids gradually settled out at the bottom 302 to form a layer of sludge 304. The clarified liquid 306 is drawn off from the body of water 302. It is of considerable importance to know the degree of settling of the foreign matter within the tank 300 and contained in the body of water 302, because the sludge must be removed either periodically or on a continuous basis. If excessive sludge 304 is allowed to accumulate at the bottom, this will detract from the capacity of the tanks, and if it is removed too quickly there will be a loss of clear liquid with the sludge. For this reason it is important to measure the level of the sludge in tank 300. The probes or heads of the present invention make it possible to not only detect the level to which the sludge has settled, but also determine the clarity of the liquid at various levels within tank 300. For example, as the probes herein disclosed are lowered in the body of water 302, where employed in portable sludge level determination use, it is possible to determine by the pitch of the sound emitted from the readout device 14 how thoroughly the settling has taken place within the body of water 302. If the change in pitch is gradual, this indicates an unthorough settling (assuming that the source of electrical energy is made available to the head or probe being employed), with the readout unit 14 indicating according to its pitch the degree of contamination which the photocell device 110 senses, in accordance with the invention of said Topol patent. If the probe or head as it is being lowered, effects a sudden change in sound, this will indicate a clear, definite interface, evidenced by the sudden transition of a high pitch to a distinctly lower sound, or no sound at all. All that is then necessary is to read off the cable 12 the depth figure provided or indicated by the indicia markers 26, and by this the sludge level and its condition are known, and, using this information the operator can judge when the opportune time exists for withdrawal of the sludge 304. The indicia markers 26 are, of course, one foot apart, measuring from the mid length position of gap 84, longitudinally of housing 50.

Figure 3:
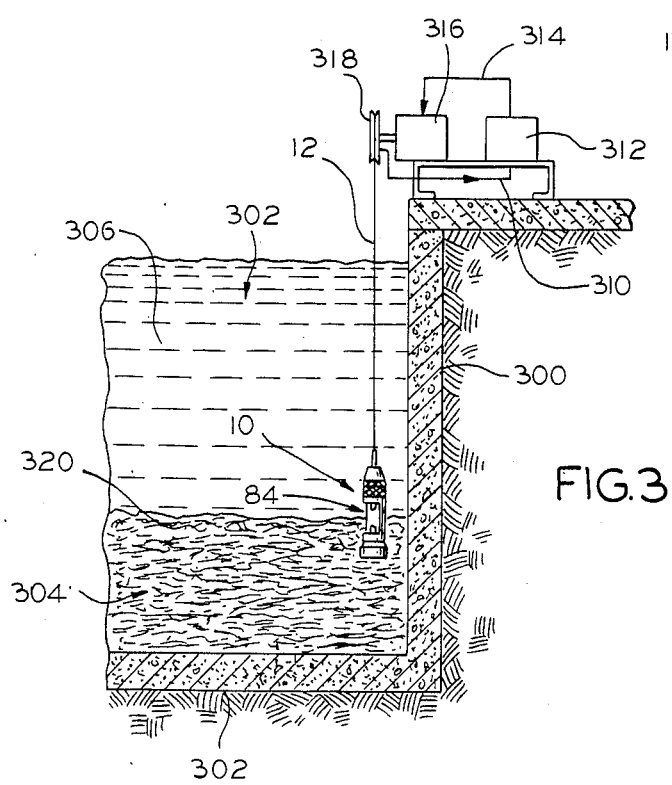
FIG. 3 is similar to FIG. 4 of said Topol patent, and illustrates the principles of the invention embodied in an apparatus in operation within a settling tank, and in which the receiver device is combined with a servomotor adapted to maintain the sensing probe or head at the sludge level.

The probes of the present invention may also be arranged to continuously follow the sludge level within the settling tank 300. Thus, as illustrated in FIG. 3, the signal received from the probe 10 can be transmitted through the conductors within the cable 12, and the signal thereof then transmitted through a conductor 310 to an input signal receiving means 312 which in turn, acting through a conductor 314, to a servomotor 316, is adapted to operate a reel 318 to which the cable 12 is connected for raising and lowering the probe 10 (or probes 10A or 10B). By suitably calibrating the strength of the signal of the sensing head through the appropriate conductors within the cable 12 to the input signal receiving means 312 and servomotor 316, the probe 10 will be maintained at a given sludge level 320. As the sludge level 320 rises or falls, this will be sensed by the sensing head or probe 10, which transmits the corresponding signal to the input signal receiving device 312 causing the servomotor 316 to operate the reel 318 and raise or lower the sensing head or probe 10 until the sensing head or probe transmits a signal calibrated through receiving means 312 2 to deenergize the servomotor 316. The cable 12 shown in FIG. 3 is equipped with the depth indicating tapes 28 which may have applied thereto the depth figures they are respectively spaced from probe or head 10 so that the operator can directly read the depth figures from the cable. There is thus provided a continuous monitoring of the level of the sludge by automatic operation including a closed loop feed back comprised of the servomotor, and photocell signal wherein these component mechanisms function interrelatedly to continuously maintain a predetermined sensing head signal not only at a predetermined or preselected sludge level.

The sensing heads or probes as associated with the other equipment herein disclosed are useful not only in determining the degree of contamination at a given level and clarifiers, but also can be employed to measure the turbidity of streams, to test the consistency of paper pulp, to measure the levels of fluidized solids, to determine the concentration of slurrys, and also to detect the liquid interface between two emissible liquids.

It will therefore be seen that the improved probes or sensing heads herein disclosed are arranged for ease and inexpensive manufacture and assembly. While the housing 50 must be formed from an electrically conductive material which will be a suitable metal, such as brass, the remaining component parts of the probe may be formed from suitable plastic materials, with the exception that the cable wiring and the electrical components it is connected to that are to have the electrical significance inherent in the electrical circuiting system of said Topol patent.

The probes or sensing heads of the present invention not only provide for complete sealing off of the head or probe housing from the liquid, when assembled, but also the probe photocell and lamp assemblies, and their respective lenses are seated well within the probe gap, and are further protected by a lens guard arrangement that permits free intrusion of the liquid being tested within the probe gap at which the testing signal is to be generated. The head or probe photocell and lamp assemblies are field replacable, that is, replacable in the field, by substituting new assemblies 125 and 125A for those in the head requiring replacement. The indented and opposed relation of the mounting of assemblies 125 and 125A, in their operative relations, recesses them adjacent the central axis 56 of the head housing (see FIG. 4) for maximized protection by the housing 50 itself. The head bumper or boot further protects assemblies 125 and 125A from jarring during use, and the disclosed lens guards ward off from the assemblies 125 and 125A, when the head is in use, hard submerged objects that could enter the gap 84 sufficiently to damage them.

The probe or sensing heads herein disclosed are smoothly contoured and streamlined in exterior, while the probe itself is relatively heavy so that it can readily penetrate within the liquid body to be tested and the sludge thereof (which is essentially liquid in character), and without disturbing or agitating the interface between the sludge layers while being lowered. The O-ring 229 affixed to the cable jacket within the head opposes withdrawal of the cable lower end from the head, when the device is in use, due to upward jerking on the cable that may be occasioned. The probe or sensing head bumper at its lower end protects the basic probe structure from surface abrasion as the result of contact with hard submerged objects when being lowered during the practice of the invention.

The foregoing description and the drawings are given merely to explain and illustrate the invention and the invention is not to be limited thereto, except insofar as the appended claims are so limited, since those skilled in the art who have the disclosure before them will be able to make modification and variations therein without departing from the scope of the invention.

I claim:

1. A sensing probe for sludge detectors adapted to be connected to the end of an insulated cable and immersed in liquids to sense sludge levels therein, said probe comprising:

an elongate cylindrical housing having upper and lower ends and defining a centrally disposed longitudinally extending axis and a cylindrical peripheral side wall, said housing defining intermediate its ends a reentrant indentation at one side of said housing interrupting its said side wall and forming a pair of opposed spaced apart housing walls and a gap in said housing side wall separating said housing opposed walls, a source of illumination mounted in sealed relation to said housing in one of said housing walls, a light sensitive device mounted in sealed relation to said housing in the other of said housing walls, said source of illumination and said light sensitive device being both lens covered, and being disposed in opposed relation lengthwise of said housing and across said gap in light transmitting relation therebetween, said housing upper and lower ends each defining a tubular stud portion, a lower end cap threaded on said housing lower end stud portion in sealed relation to said housing, said lower end cap being seated in a dished elastomeric bumper, means for frictionally retaining said bumper on said lower end cap, an upper end cap threaded on said housing upper tubular stud portion in sealed relation to said housing and defining an upstanding stud portion at the upper end thereof having a through bore with an annular internal sealing surfacing adjacent the upper end of said upper end cap stud portion, an elastomeric grommet seated against said upper end cap stud portion sealing surfacing and having an upper bearing surface, a gland ring seated on said grommet bearing surface, a nut member threaded on said upper end cap stud portion and having an annular internal surface for compressing said gland ring against said grommet to bias said grommet in sealing relation to said upper end cap stud portion sealing surface, and protective means mounted on said housing and spanning said indentation for shielding said lenses from breakage and being configured to accommodate free liquid intrusion within said indentation.

2. The probe set forth in claim 1 wherein:
said protective means comprises a brace member secured to said housing across said gap.

3. The probe set forth in claim 2 wherein:
said brace member extends longitudinally of said housing and is aligned with said lenses radially of said housing.

4. The probe set forth in claim 2 wherein:

said brace member extends transversely of said housing intermediate said lenses.

5. In a sludge level detector including a sensing head, having optical means for detecting sludge, connected to the end of an electric cable naving a source of electrical energy and means for reading out the signal generated in said sensing head when immersed in liquids to sense sludge levels therein, the improvement wherein said head comprises:

an elongate cylindrical housing having upper and lower ends and defining a centrally disposed longitudinally extending axis and a cylindrical peripheral side wall substantially centered on said axis, said housing defining intermediate its ends a reentrant indentation at one side of said head interrrupting its said side wall and forming a pair of opposed spaced apart first and second housing walls and a gap therebetween internally of said housing side wall, a source of illumination mounted in sealed relation to said housing in one of said housing walls, a light sensitive device mounted in sealed relation to said housing in the other of said housing walls, said source of illumination and said light sensitve device being lens covered by a separate lens therefor anchored to said housing and disposed in opposed relation longitudinally of said housing and across said gap, said housing upper and lower ends each defining a tubular stud end portion, a lower end cap threaded on said housing lower end stud portion in sealing relation to said housing, a elastomeric bumper frictionally received on said lower end cap in substantial overlying relation thereto, an upper end cap threaded on said housing upper tubular stud portion in sealed relation to said housing and defining an upstanding stud end portion having an end extending away from said housing and defining a through bore having an annular internal sealing surfacing adjacent said end of said stud end portion, with the cable extending into said upper end cap stud end portion through bore, said housing being apertured for electrical connection of said source of illumination and said light sensitive device to said cable in make-break signal relation thereto when said cable is connected to the source of electrical energy, an elastomeric grommet received about the cable and having one end thereof seated against said upper end cap stud portion sealing surfacing, a gland ring received about the cable and seated against said grommet other end, and a nut member received about the cable and threaded on said upper end cap stud portion against said gland ring for compressing said gland ring against said grommet to bias said grommet against said upper end cap stud portion surfacing in sealing relation thereto and compress said grommet against said cable in sealing relation thereto.

6. The improvement set forth in claim 5 including:

protective means mounted on said housing and spanning said gap for shielding said lenses from breakage and configured to accommodate free liquid intrusion within said gap, said protective means comprising a brace member secured to said housing and disposed within said gap.

7. The improvement set forth in claim 5 wherein:

said brace member comprises a one piece rod element removably anchored to said housing.

8. The improvement set forth in claim 5 wherein:

said indentation extends crosswise of said housing from said one side of said head toward the other side of said head beyond said axis, and defines a third wall within said gap that extends longitudinally of said housing and normally of said opposed walls.

9. The improvement set forth in claim 5 wherein:

said bumper is dished in configuration and includes a side wall overlying the housing lower end, with the upper portion of said bumper side wall being in resiliently stretched relation about and against said head.

10. The improvement set forth in claim 5 wherein:

said nut and said gland ring having cooperating annular frusto-conical bearing surfaces.

11. The improvement set forth in claim 10 wnerein:

said nut and said gland ring having cooperating annular planar bearing surfaces that are concentric of their respective frusto-conical surfaces.

12. The improvement set forth in claim 11 including:

an elastomeric sleeve received about the cable within said nut member and extending outwardly of said nut member and upwardly of said head, said nut member being counterbored from the upper end thereof inwardly thereof but short of said planar bearing thereof to receive said sleeve at the lower end of said sleeve in overlapping close fitting relation thereto a dimension longitudinally of said axis that approximates the thickness of said cable.

13. The improvement set forth in claim 12 wherein:

said nut member from said upper portion thereof defines a downwardiy extending conical external surfacing centered on said axis and having its major diameter congruent with said housing side wall.

14. The improvement set forth in claim 12 wherein:

said end caps have cylindrical external configurations substantially congruent with said housing side wall.

15. The improvement set forth in claim 9 including:

an O-ring adhered to said cable adjacent said one end of and below said grommet.

* * * * *